April 14, 1953  A. J. MATHES  2,634,631
CIRCULAR SAW GAUGE AND SET
Filed Aug. 23, 1949
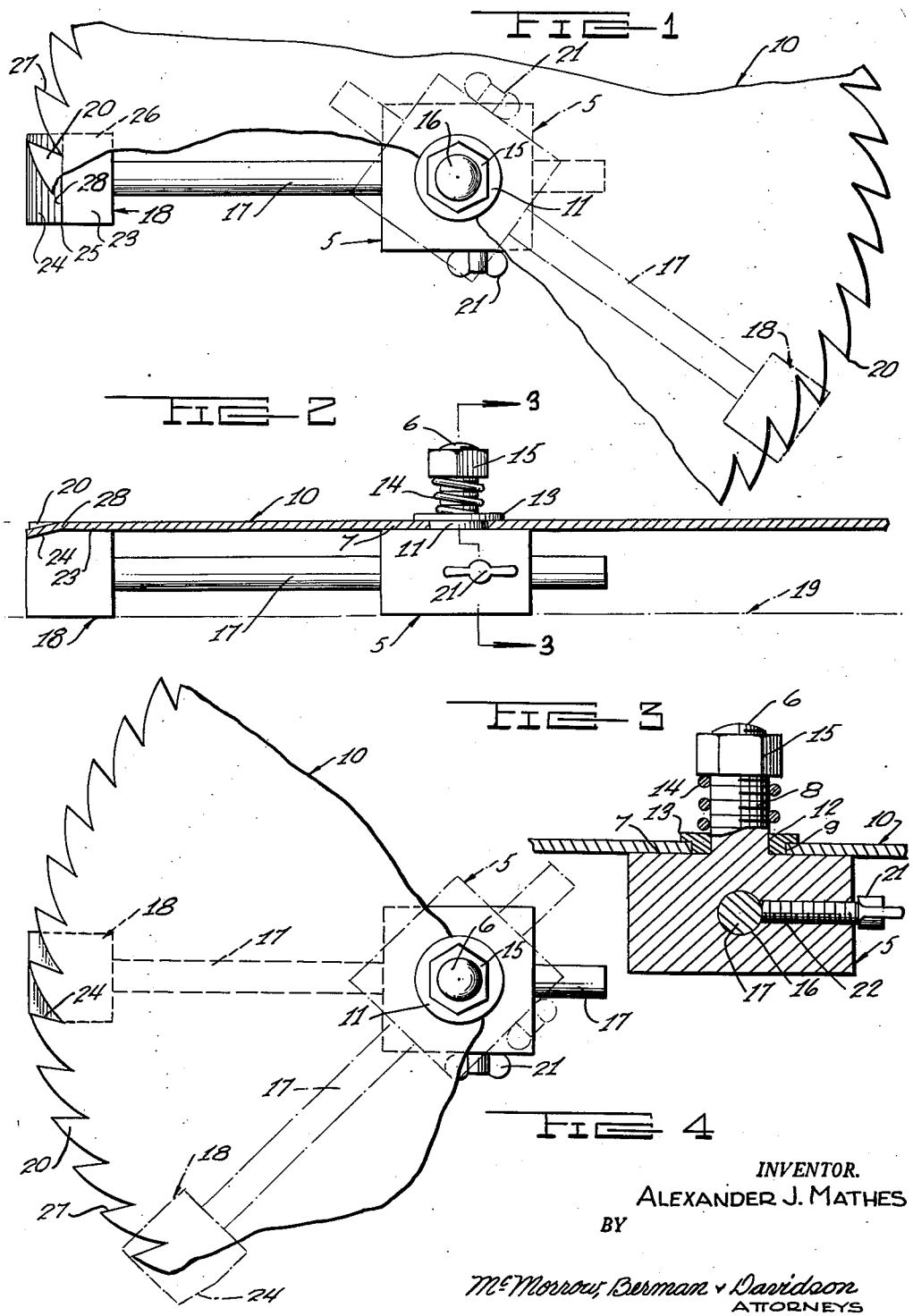
INVENTOR.
ALEXANDER J. MATHES
BY
McMorrow, Berman & Davidson
ATTORNEYS Patented Apr. 14, 1953

2,634,631

UNITED STATES PATENT OFFICE 2,634,631

CIRCULAR SAW GAUGE AND SET

Alexander J. Mathes, Chicago, Ill.

Application August 23, 1949, Serial No. 111,878

1 Claim. (Cl. 76—73)

This invention relates to a combined gauge and set for circular saws, the primary object of the invention being to provide a practical and efficient device of this kind which enables both gauging and setting operations to be easily and accurately performed with a single instrument, and without requiring dismantling and reassembling of major components of the instrument for each operation.

Another important object of the invention is to provide a dual-purpose device of the character indicated above which is composed of a minimum number of simple parts and can be made in a rugged and mechanically-adequate form at relatively low cost, because of which the device has special appeal to individual saw operators, as well as to manufacturers and large-scale processors of circular saws.

A further important object of the invention is the provision of an easily-portable device of the above-indicated character which can be supported for use by being laid upon a flat surface or placed in an ordinary vice.

Other important objects and advantageous features of my invention will be apparent from the following description and the accompanying drawings, wherein, merely for illustration herein, a specific embodiment of the invention is set forth in detail.

In the drawings:

Figure 1 is a fragmentary top plan view showing the device arranged for setting teeth of a circular saw;

Figure 2 is a transverse vertical section taken through Figure 1 alongside the device;

Figure 3 is an enlarged transverse vertical section taken on the line 3—3 of Figure 2;

Figure 4 is a view similar to Figure 1, showing the device arranged for gauging teeth of a circular saw.

Referring in detail to the drawings, wherein like numerals designate like parts throughout the several views, the illustrated circular saw-tooth-gauging and setting device comprises a flattened, rectangular base block 5 of substantial thickness and mass, having an integral central post 6 rising above its upper surface 7, having screw-threads 8 along its upper part. The diameter of the post 6 is substantially smaller than the center hole 9 of a circular saw 10 with which the device is to be used.

A spacer ring 11, having a center opening 12 slidably fitting the post 6, has a diameter selected to fit the center hole 9 of the saw 10, and includes a lateral annular flange 13 at its upper end to rest upon the top of the saw 10 around its center hole 9, with the lower end of the ring resting upon the upper surface of the block 5, as shown in Figure 3. The spacer rings 11 may have different shapes to fit the correspondingly-shaped saw center holes.

A helical spring 14 is circumposed on the post 6 above the ring 11, with its lower end resting upon the ring 11, and a clamping nut 15 is threaded on the post 6 and arranged to be turned down on the post 6 to compress the spring 14 and thereby clamp the saw 10 in place on the block 5. The nut 15 is adapted to be run up on the post 6 and removed therefrom to permit removal of the spring 14 and ring 11 from the post 6 and thereby permit removal and replacement of the saw 10.

The block 5 is formed with a smooth bore 16 extending therethrough in line with the post 6, in which is slidably positioned a smooth, round rod or shaft 17, having on its outer end a gauging and setting block 18.

The block 18 is substantially square, and is of the same thickness as the base block 5, so that when the device is supported for use on a horizontal surface 19, the device is level and adequately supported for filing and peening of the saw teeth 20.

A wing-nut-equipped set screw 21 is threaded through a threaded bore 22 extending at right angles to the smooth bore 16 and opening into the bore 16 and through a side of the base block to engage the side of the rod 17 for locking the gauging and setting block 18 in a selected position achieved by rotating the rod 17 and sliding it in the bore 16 in accordance with the diameter of the saw 10 and whether a gauging or a setting operation is to be performed.

The top 23 of the block 18 has a combined gauging and setting surface 24 at its outer end extending thereacross from the opposite sides 25, 26, respectively, the surface 24 having the correct angulation for the cutting edge 27 of the saw teeth 20 and for the angular set of the teeth 20, and having a width corresponding to the length of the teeth 20.

For a setting operation, the block 18 is used in its upright position with the saw resting upon the top 23 of the block and upon the top 7 of the base block 5, as shown in Figures 1 and 2. The rod 17 having been properly adjusted in the base block 5 for the diameter of the saw 10, the selected saw tooth 20 will overlie the angulated surface 24 of the block 18, so that the tooth can be peened to proper pitch conforming to the angle of the surface 24 by means of a hammer (not shown).

For a gauging and filing operation, the nut 15 is loosened to permit the block 18 to be turned on its side so that one end of the angled surface 24 can be coincided with the cutting edge 27 of the tooth, as a filing gauge, as shown in Figure 4. The nut 15 is then retightened and filing of the angulated tooth edge is performed with a file (not shown) with the surface 24 as a guide and gauge if the tooth edge requires filing to conform to the angulation of the surface 24. The saw 10 can be reversed on the device to set and/or gauge oppositely-arranged teeth 20. The length of the teeth 20 is gauged visually against the width of the surface 24, whose inward edge 28 is positioned at the inward ends of the teeth 20 in adjusting the device for use.

I claim:

In a combined gauge and set for teeth of a circular saw, a base block having an undersurface adapted to rest upon a horizontal surface, said base block having an upper surface upon which a circular saw is adapted to rest, said base block being formed with a transverse horizontal bore parallel to and spaced from its upper and under surfaces, a gauging and setting block having an under surface adapted to rest upon the same horizontal surface, said gauging and setting block having an upper surface positioned in the same horizontal plane as the upper surface of the base block for supporting a peripheral part of a circular saw resting upon the upper surface of the base block, a horizontal rod fixed on said gauging and setting block and extending slidably and rotatably through the bore in the base block, said gauging and setting block having parallel opposite sides one of which is arranged to rest upon said horizontal surface in a rotated position of the gauging and setting block and present the other side in the same horizontal plane as the upper surface of the base block, means on said base block for releasably locking said rod in adjusted position in the bore of the base block, means on said base block for securing a circular saw in centered position on the upper surface of the base block, a portion of the upper surface of said gauging and setting block being formed to provide an angulated surface at the end of said upper surface remote from said rod and extending to the said opposite sides of the gauging and setting block, said angulated surface being downwardly angulated with respect to the said upper surface of the gauging and setting block to serve as a tooth setting anvil while said gauging and setting block is in an upright position, an end of the angulated surface being arranged to serve as a gauge and filing guide for the cutting edge of a saw-tooth when said gauging and setting block occupies a rotated position with one of said opposite sides resting upon the horizontal surface and with the other of said opposite sides in supporting relation to a peripheral part of the saw.

ALEXANDER J. MATHES.

References Cited in the file of this patent

UNITED STATES PATENTS

| Number | Name | Date |
|---|---|---|
| 890,727 | Todd | June 16, 1908 |
| 1,658,691 | Shira | Feb. 7, 1928 |
| 1,683,174 | Eyrish | Sept. 4, 1928 |
| 1,836,120 | Huther | Dec. 15, 1931 |
| 1,853,245 | Wardwell | Apr. 12, 1932 |
| 1,909,832 | Jirka | May 16, 1933 |
| 1,937,261 | Billingsley | Nov. 28, 1933 |
| 1,966,364 | Thraser | July 10, 1934 |
| 2,135,891 | Gommel | Nov. 8, 1938 |
| 2,336,761 | Upright | Dec. 14, 1943 |
| 2,463,007 | Wheeler | Mar. 1, 1949 |